United States Patent [19]

Wainwright et al.

[11] Patent Number: 4,932,706
[45] Date of Patent: Jun. 12, 1990

[54] FORWARDLY FOLDABLE SEAT ASSEMBLY

[75] Inventors: John C. Wainwright, Riverview; Gerald A. Wake, Livonia, both of Mich.

[73] Assignee: Lear Siegler Seating Corporation, Southfield, Mich.

[21] Appl. No.: 290,681

[22] Filed: Dec. 27, 1988

[51] Int. Cl.[5] .................................. B60N 1/10
[52] U.S. Cl. ................... 296/65.1; 296/69; 297/346; 297/379
[58] Field of Search .......... 296/65.1, 66, 68.1, 296/69; 297/331, 335, 346, 379; 248/188.2, 419, 421

[56] References Cited

U.S. PATENT DOCUMENTS

| | | | |
|---|---|---|---|
| 1,427,280 | 9/1922 | Gahm | 297/346 X |
| 2,076,309 | 4/1937 | Whedon | 248/421 X |
| 2,090,436 | 8/1937 | Whedon et al. | 248/421 X |
| 2,151,156 | 3/1939 | Saunders et al. | 248/419 |
| 2,235,237 | 3/1941 | Saunders et al. | 248/419 |
| 2,780,276 | 2/1957 | Valente | 248/419 |
| 3,151,906 | 10/1964 | Roberts | 296/69 X |
| 3,316,014 | 4/1967 | Barecki | 297/346 X |
| 4,519,646 | 5/1985 | Leitermann et al. | 296/69 X |

FOREIGN PATENT DOCUMENTS

| | | | |
|---|---|---|---|
| 105821 | 11/1938 | Australia | 248/419 |
| 528001 | 4/1954 | Belgium | 297/346 |
| 159414 | 12/1963 | U.S.S.R. | 248/421 |

Primary Examiner—Margaret A. Focarino
Assistant Examiner—Gary C. Hoge
Attorney, Agent, or Firm—Reising, Ethington, Barnard, Perry & Milton

[57] ABSTRACT

A vehicle seat assembly (10) of the type for moving between an upright seating position and a forwardly folded position. The assembly (10) includes a base member (12) secured to the vehicle floor. Front (20) and rear (22) support brackets extend upwardly from the base member (12) and include tabs (24) for supporting a seat (56). A cross member (28) is pivotally connected to the base member (12) and front support bracket (20). The cross member (28) reacts in tension to a seating load and remains in tension in the event of an inertia or other force applied to the assembly (10) in the forward direction. When in the forwardly folded position, the cross member (28) nests within the front support bracket (20) and base member (12), and the rear support bracket (22) overlies a portion of the base member (12).

20 Claims, 4 Drawing Sheets

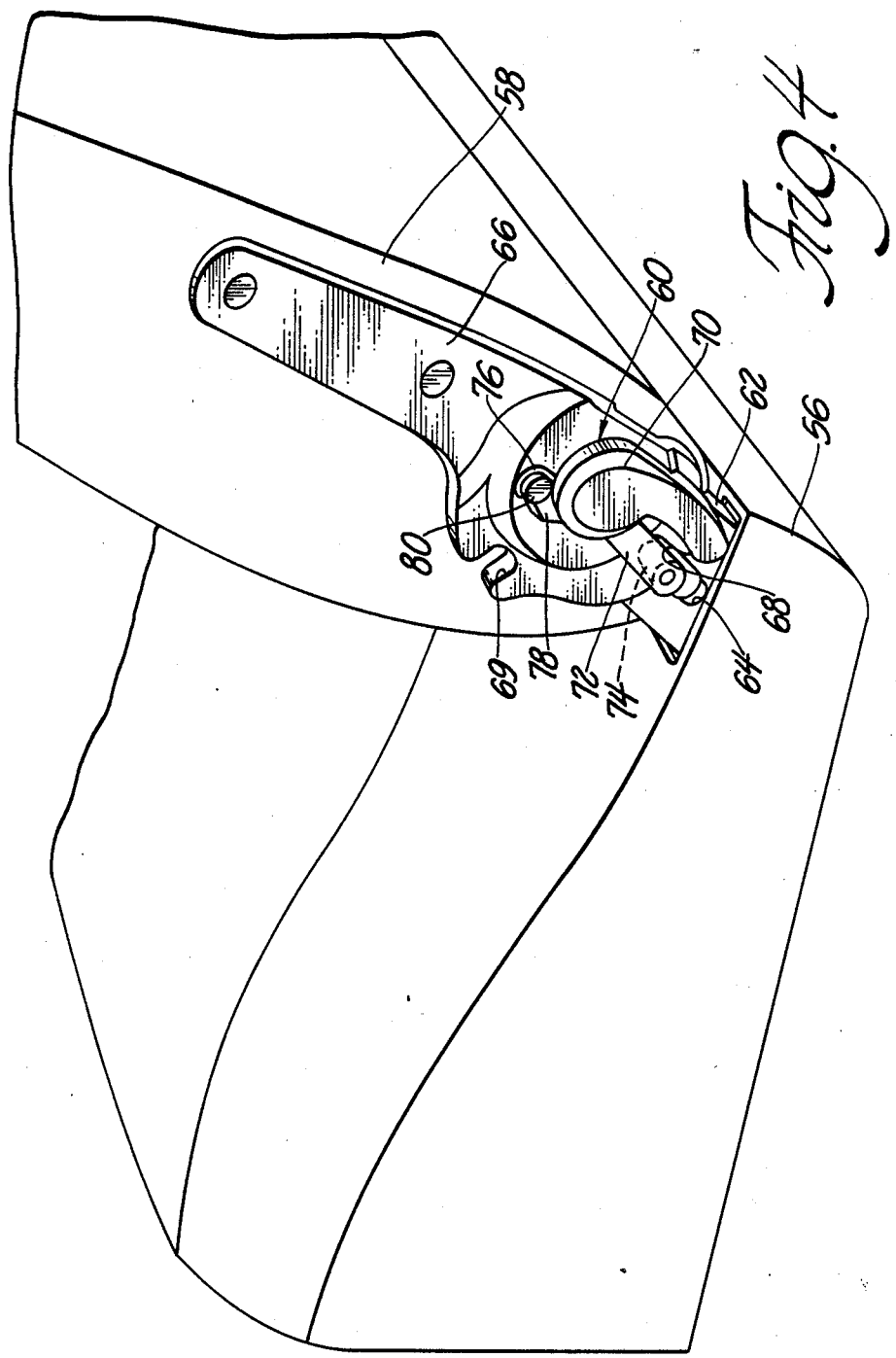

FORWARDLY FOLDABLE SEAT ASSEMBLY

TECHNICAL FIELD

This invention relates to vehicle seats. Specifically, this invention relates to vehicle seats which are capable of moving between an upright seating position and a forwardly folded position.

BACKGROUND ART

In a vehicle, it is desirable to include a seat which capable of folding between an upright seating position and a forwardly folded position. In the forwardly folded position, the back of the seat is often used as a load carrying surface. That is, as the seat is folded, the back can be used as an extension of the vehicle floor to carry loads other than people. It is important that the seat be folded as low to the floor as possible.

U.S. Pat. No. 4,105,245 to Simons et al issued Aug. 8, 1978 discloses a forwardly folded seat assembly. The seat assembly includes a frame. The frame comprises a plurality of links pivotally secured together which form a parallelogram. The assembly further includes a cross link. The cross link is collapsible and allows the frame assembly to be moved to the forwardly folded position and locks the same in the upright seating position. The seating load on the frame is carried in tension by the cross link. When a force is applied in the forward direction of the vehicle, however, the cross link is placed in compression and carries the load in compression. This compressive force requires a relatively heavy and sturdy beam.

Assemblies are constantly sought which maximize strength and foldability in the minimum of space and with a minimum of material.

SUMMARY OF THE INVENTION AND ADVANTAGES

According to the present invention there is provided a vehicle seat assembly adapted to be mounted on a vehicle floor of the type for moving between an upright seating position and a forwardly folded position. The assembly comprises base means adapted for a fixed connection to the vehicle floor. The base means has a front portion and a rear portion. The assembly further includes seat support means pivotally mounted to the base means for moving between the upright seating position and the forwardly folded position. The assembly is characterized by the seat support means further including a cross member pivotally connected to the base means. The cross member reacts in tension in response to inertia forces applied to the assembly in the direction from the rear portion of the base means toward the front portion of the base means.

Accordingly, there is provided a vehicle seat assembly which, when a force is applied in the forward direction of the vehicle, carries the load in tension. This permits the assembly to be substantially lighter and more compact while retaining the necessary strength. Less material need be used in the present assembly to attain the strength previously available. This substantially reduces the weight and cost of the assembly.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a perspective view of a seat latch made in accordance with the instant invention.

DETAILED DESCRIPTION OF THE DRAWINGS

Figure 1:
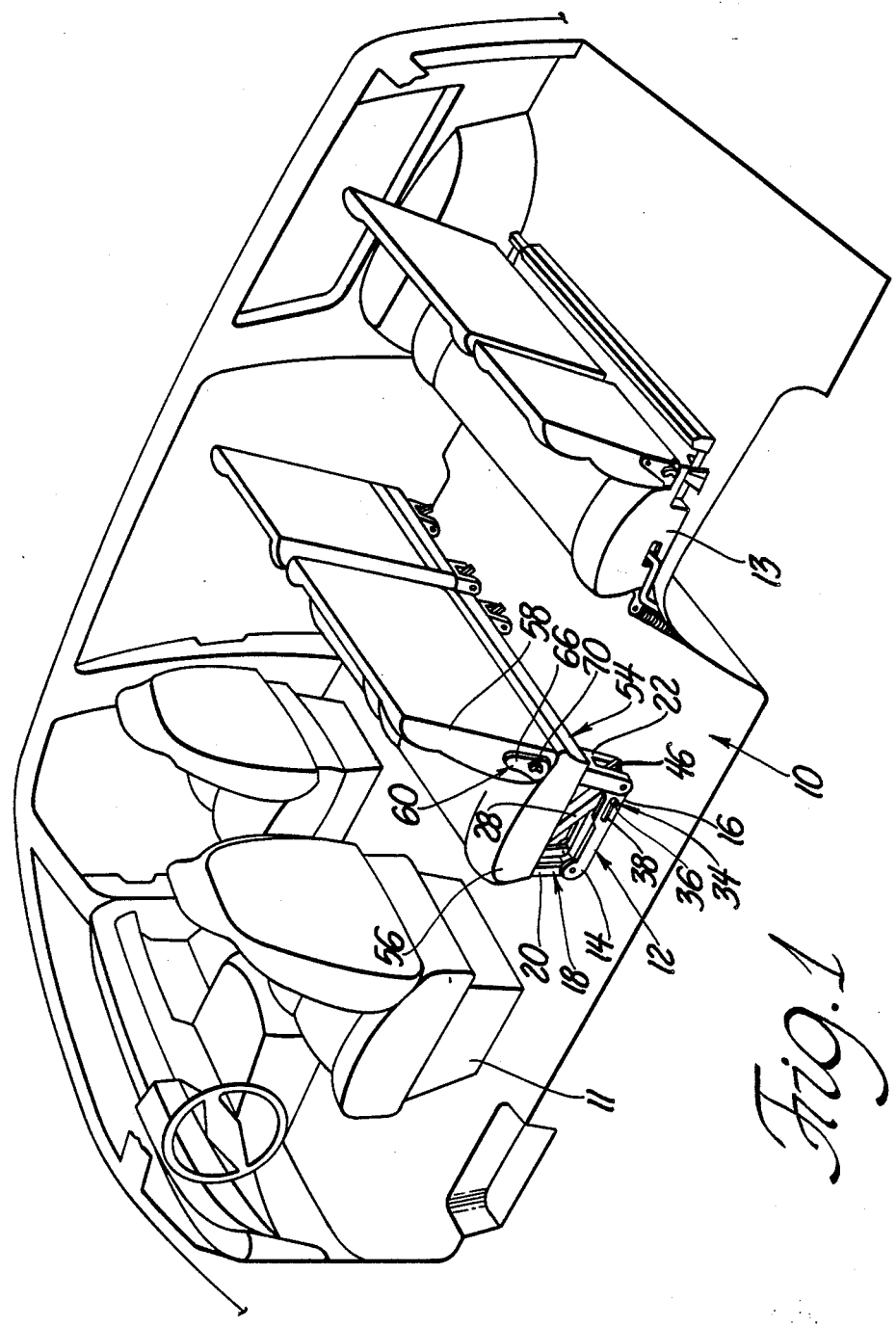
FIG. 1 is a perspective view of the interior of a vehicle utilizing the subject seat assembly.

A vehicle seat assembly adapted to be mounted on a vehicle floor of the type for moving between an upright seating position and a forward folded position is generally shown at 10 in the Figures. The assembly 10 may be utilized in many different environments. The assembly 10, however, is particularly well adapted for being the second seat in a mini-van having three seats. The first seat 11 and third seat 13 are best viewed in FIGS. 1 and 2.

The assembly 10 includes base means adapted for fixed connection to the vehicle floor. The base means comprises a base member generally indicated at 12. The base member 12 has front 14 and rear 16 portions. The front portion 14 faces forwardly in the vehicle. In other words, the base member 12 extends forwardly and rearwardly with respect to the vehicle; the front portion 14 facing forwardly in the vehicle, and the rear portion facing rearwardly with respect to the vehicle.

The assembly 10 further includes seat support means or assembly generally indicated at 18. The seat support assembly 18 is pivotally mounted to the base member 12 and is for moving between the upright seating position and the forwardly folded position. The seat support assembly 18 comprises a front support bracket 20. The front support bracket 20 is pivotally mounted to the front portion 14 of the base member 12. The seat support means 18 further comprises a rear support bracket 22 pivotally mounted to the rear portion 16 of the base member 12. The front support bracket 20 and rear support bracket 22 include a plurality of seat support tabs 24. The tabs 24 are pivotally mounted at the upward ends of the front 20 and rear 22 support bracket. That is, the tabs 24 are pivotally connected at the end opposite of the connections of the support brackets 20, 22 to the base member 12. The tabs 24 include an upwardly facing surface 26 for supporting a vehicle seat thereon.

The seat support assembly 18 further includes a cross member 28. The cross member 28 is pivotally connected to the base member 12 for reacting in tension in response to inertia forces applied to the assembly 10 in the direction from the rear portion 16 toward the front portion 14 of the base member 12. Specifically, the cross member 28 has first 30 and second 32 ends. The first end 30 of the cross member 28 is pivotally connected to the rear portion 16 of the base member 12. The cross member 28 extends forwardly and upwardly and the second end 32 is pivotally mounted to the front support bracket 20. The cross member 28 is preferably only pivotable about the first and second ends 30, 32. When an inertia force, such as from a sudden stop, is applied in the forward direction, the cross member 28 remains in tension. That is, the cross member 28 is pulled in response to such a force.

The cross member 28 includes counterbalance means comprising a spring 50 thereon. The counterbalance means further comprises a rod 52 pivotally connected between the cross member 28 and the rear support bracket 22. The spring 50 also engages the rod 52. The spring 50 and rod 52 aid the movement of the cross member between the upright seating position and the forwardly folded position.

The assembly further includes lost motion connection means generally indicated at 34 at one of the ends 32 of the cross member 28 for allowing relative translational movement between the cross member 28 and the base member 12. Specifically, the lost motion connection means 34 comprises a pin 36 pivotally disposed through the first end 30 of the cross member 28. The lost motion connection means 34 further comprises an elongated slot 38 extending longitudinally within the base member 12. The pin 36 is disposed in the slot 38 for allowing translational movement of the pin 36 within the slot 38 while simultaneously allowing for pivotal movement of the pin 36 within the slot 38 as will be described in greater detail subsequently.

Locking means, generally indicated at 40, is included for selectively preventing translational movement of the cross member 28 relative to the base member 12. This permits the assembly 10 to be selectively locked in the upright seating position. More particularly, the locking means 40 comprises at least one locking member 42. The locking member 42 includes a shoulder for engaging the pin 36 when the assembly is in the upright seating position to prevent translational movement of the pin 36 within the slot 38. The locking means 40 further includes biasing means in the form of a spring (not shown) for biasing a locking member 42 into the pin 36. When the locking member 42 engages the pin 36, translational movement of the pin 36 is prohibited, thus locking the assembly 10 in the upright seating position.

The locking means 40 further comprises release means generally indicated at 44. The release means 44 is for releasing the locking member 42 from the pin 36. This allows translational movement of the pin 36 within the slot 38 to permit the assembly 10 to move to the forwardly folded position. The release means comprises a lever 46. The lever 46 is pivotal and applies a force to the locking member 42 sufficient to overcome the biasing force of the spring acting on the locking member 42 to remove the locking member 42 from contact with the pin 36.

The assembly 10 further includes a vehicle seat generally indicated at 54. The seat 54 includes a lower seating portion or cushion 56. The lower seating portion 56 is supported on the upwardly facing surface 26 of the seat support tabs 24. The seat 54 further includes an upper back rest portion 58. The upper back rest portion 58 extends upwardly from the rear of the lower seating portion 56 when the assembly 10 is in the forwardly folded position. When the assembly 10 is on the forwardly folded position, as viewed in FIG. 2, the upper back rest portion 58 is folded onto the lower seating portion 56. The back rest portion 58 then becomes a load carrying surface.

The assembly 10 also includes latching means generally indicated at 60. The latching means 60 permits selective pivoting movement of the back rest portion 58 between the upright position and the forwardly folded position. The latching means 60 includes a lower frame member 62 fixedly secured to and extending upwardly from the lower seating portion 56. The lower frame member 62 includes a latching slot 64 therethrough. The latching means 60 further includes an upper frame member 66. The upper frame member 66 is fixedly secured to the upper back rest portion 58. The upper frame member 66 includes a plurality of notches 68, 69 therein. The upper frame member 66 and lower frame member 62 are pivotally connected by a pin (not shown). A latch lever 70 is also pivotally attached to the pin. The latch arm 72 having a finger 74 is also included. The latch arm 72 is pivotally connected to the latch lever 70. The finger 74 engages the slot 64 and the notches 68, 69 to selectively lock the upper back rest portion in the upright seating position and the forwardly folded position, respectively. The finger 74 is slideably disposed in the slot 64. The latching means 60 further includes a spring 76 which biases the latch lever 70. The latch lever 70 further includes a radially extending stop member 78. The stop member 78 is for engaging a post 80 on the upper frame member 66 and limiting pivotal movement of the latch lever 70.

The base member 12 has a substantially U-shaped cross section. The bottom portion of the base member 12 is adapted for fixed attachment to the vehicle floor. The sides of the base member 12 extend upwardly from the floor of the vehicle. The front 20 and rear 22 support brackets also have a substantially U-shaped cross section. The rear support bracket 22 has a greater cross-sectional width than said base member 12. Thus, the rear support bracket 22 is fixedly attached to the rear portion 16 of the base member 12 about the periphery of the base member 12. The front support bracket 20 has a smaller cross-sectional width than the base member 12. The front support bracket 20 is pivotally disposed inside the base member 12. The cross member also has a substantially U-shaped cross section. The cross member has a smaller cross-sectional width than all of the front 20 and rear 22 support brackets and base member 12.

In the upright seating position, the base member 12 front and rear support brackets 20, and 22 and the lower portion of the seat 48 form generally a parallelogram. The cross member extends from the rear portion of the base member 12 to the upper portion of the front support bracket 20. As the assembly is moved to the forwardly folded position, the cross member 28 is disposed within the base member 12 and front support bracket 20 for allowing nesting engagement of the cross member 28 with the base 12 and front support bracket 20. Further the rear support bracket 22 is folded over the base member 12 to provide complete nesting of the seat support means 18.

Figure 2:
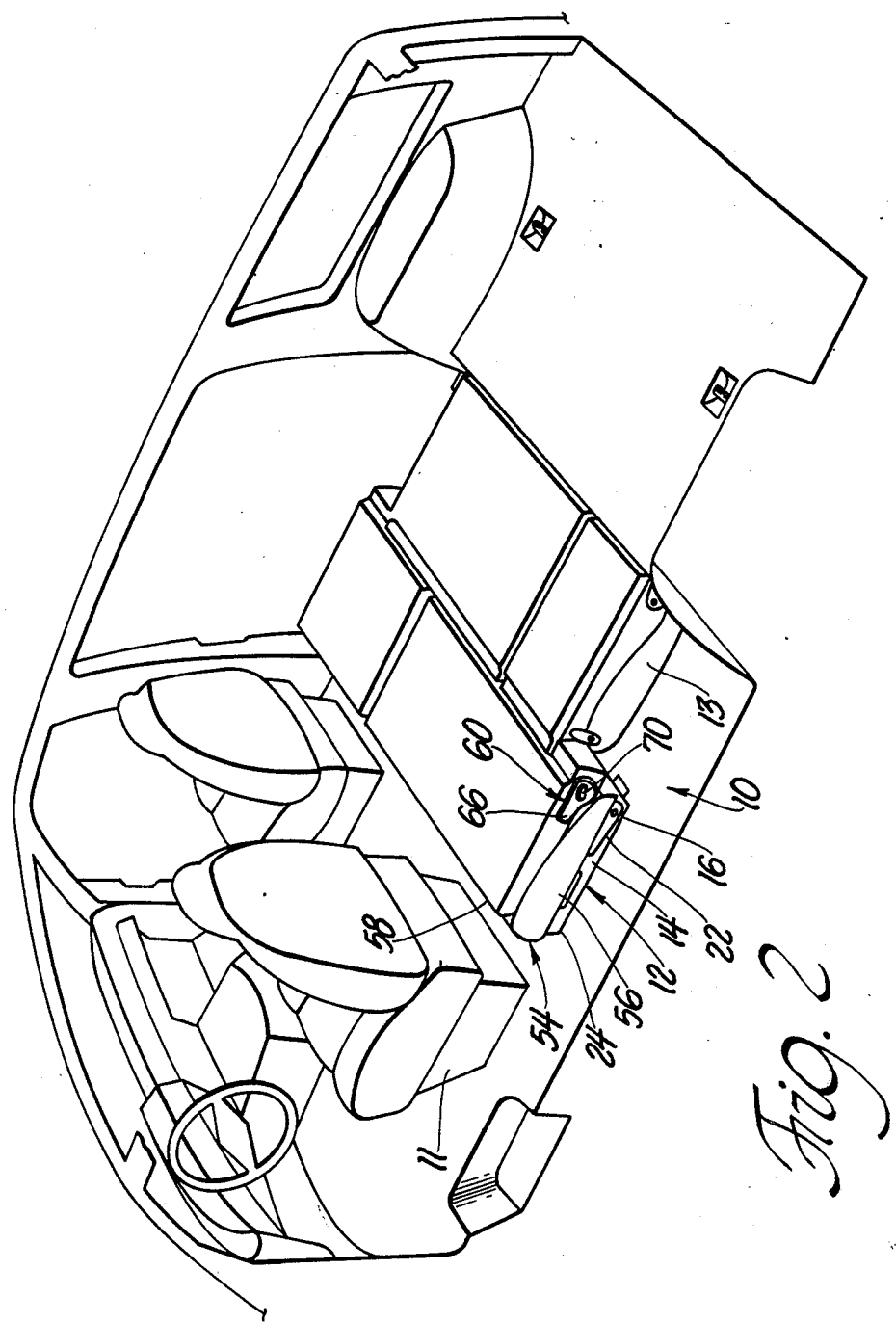
FIG. 2 is a perspective view of the interior of a vehicle with the subject seat assembly in the forwardly folded position.
Figure 3:
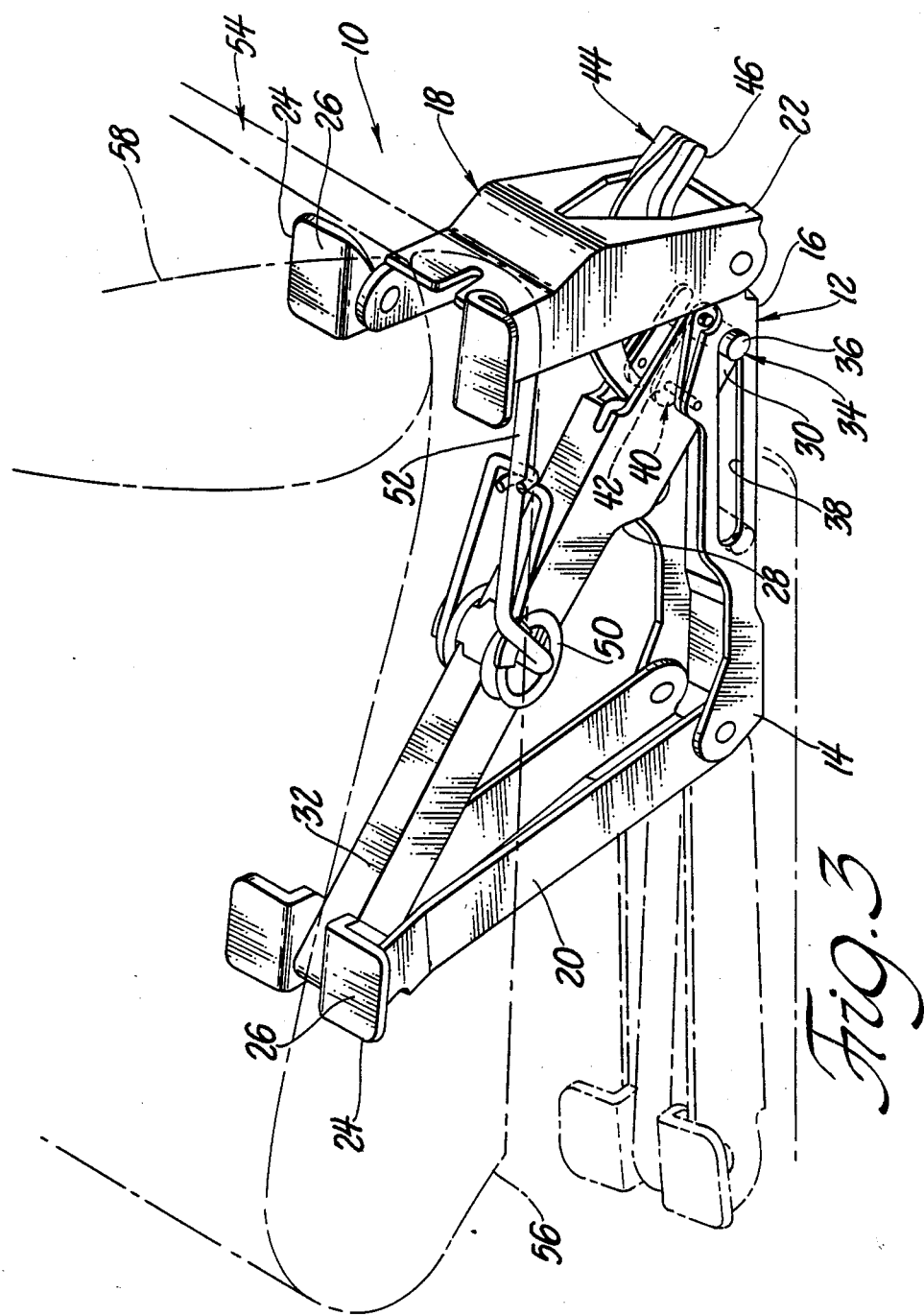
FIG. 3 is a perspective view of a seat assembly made in accordance with the instant invention.

In operation, the seat 54 is initially in the upright seating position as shown in FIG. 1. To move the seat to the forwardly folded position, the latch lever 70 is pulled. This permits the finger 74 to slide within the slot 64, and out of the notch 68. The upper back rest portion 58 can then be pivoted downwardly and over the lower seating portion 56 until the finger 74 moves into the notch 69 under the biasing force of the spring 76. The upper back rest portion 58 is thus locked in the forwardly folded position. An upward force is then applied to the lever 46. The lever 46 applies a force to the locking member 42 sufficient to overcome the biasing of the spring (not shown). The locking member 42 is thereby released from engagement with the pin 36. A force is then applied to the seat 54 in the forward direction. This force is transmitted to both the front support bracket 20 and rear support bracket 22 by the lower seating portion 56. Because the pin 36 is free to move within the slot 38, the front support bracket 20 is allowed to pivot forwardly. As the front support bracket 20 pivots forwardly, the pin 36 moves through the slot 38. This causes the cross member 28 to fold into the front support bracket 20 and base member 12. Further, the rear support bracket 22 is folded over the base member 12. The spring 50 aids the pivoting movement. The seat assembly 10 is then in the forwardly folded position. In this position, the cross member 28 is nested within the front support bracket 20 and base member 12. Further, the rear support bracket 22 is folded down over the base member 12. In this nested engagement, the assembly 10 is as low to the floor of the vehicle as possible. Further, the back rest portion 58 becomes a load carrying surface. It is appreciated that forward pivoting movement of the upper back rest member 58 is totally independent of forward pivoting movement of the front and rear 20, 22 supports.

To return the seat assembly 10 to the upright seating position, a force in the upward and rearward direction is applied to the vehicle seat 54. The front support bracket 20 and rear support brackets 22 pivot about their respective pivot points on the base member 12. The spring 50 and rod 52 aid pivoting movement of the cross member 28. The pin 36 moves within the slot 38 until the pin 36 engages the locking member 42 which is biased into the pin 36 by the spring. When the pin 36 engages the locking member 42, the seat support means 18 is locked in the upright seating position. Finally, the latch lever 70 is rotated to remove the finger from the notch 69. The upper back rest member 58 is then pivoted to the upright seating position until the finger 74 engages the notch 68.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A vehicle seat assembly (10) adapted to be mounted on a vehicle floor of the type for moving between an upright seating position and a forwardly folded position, said assembly (10) comprising:
   a vehicle having a floor;
   base means (12) fixedly connected to said vehicle floor and having a front portion (14) facing forwardly in said vehicle and a rear portion (16) facing rearwardly in said vehicle, and seat support means fixedly mounted to said base means for moving between the upright seating position and the forwardly folded position;
   a lower seating portion (56) supported by said seat support means (18);
   an upper back rest portion (58) extending upwardly from said lower seating portion (56) said lower seating portion (56) positioned forwardly of said upper back rest portion (58) with respect to said vehicle;
   said assembly characterized by said seat support means (18) further including a cross member (28) pivotally connected to said base means (12) for reacting between said base means (12) and said seat support means (18) in tension in response to inertia forces applied to said assembly (10) in the direction from said rear portion (16) toward said front support portion (14) of said base means (12).

2. An assembly as set forth in claim 1 further characterized by said cross member (28) having first (30) and second ends (32), said first end (30) pivotally connected to said rear portion of said base means (12) and extending forwardly and upwardly.

3. An assembly as set forth in claim 2 further characterized by said frame means (12) including lost motion connection means (34) at one end of said cross member (28) for allowing relative translational movement between said cross member (28) and said base means (12).

4. An assembly as set forth in claim 3 further characterized by including locking means (40) for selectively preventing said translational movement of said cross member (28) relative to said base means (12) whereby said assembly (10) may be locked in the upright seating position.

5. An assembly as set forth in claim 4 further characterized by said lost motion connection means (34) comprising a pin (36) pivotally disposed through said first end (30) of said cross member (28) and a slot (38) extending longitudinally within said base means (12), said pin (36) disposed in said slot (38) for allowing translational and pivotal movement of said pin (36).

6. An assembly as set forth in claim 5 further characterized by said seat support means (18) comprising; a front support bracket (20) pivotally connected to said front portion (14) of said base means (12) and a rear support bracket (22) pivotally connected to said rear portion (16) of said base means (12).

7. An assembly as set forth in claim 6 further characterized by including a seat (54) comprising a lower seating portion (56) pivotally connected to said front support bracket (20) and said rear support bracket (22) and an upper back rest portion (58) extending upwardly from said lower seating portion (56).

8. An assembly as set forth in claim 7 further characterized by said cross member (28) being pivotally connected to said front support bracket (20).

9. An assembly as set forth in claim 8 further characterized by said base means (12) comprising a base member (12) having a substantially U-shaped cross section.

10. An assembly as set forth in claim 9 further characterized by said front (20) and said rear (22) support brackets having a substantially U-shaped cross section, said rear support bracket (22) having a greater cross-sectional width than said base member (12), said front support bracket (20) having a smaller cross-sectional width than said base member (12).

11. An assembly as set forth in claim 11 further characterized by said cross member (28) having a substantially U-shaped cross section of smaller width than said base member (12) and said support brackets (20, 22).

12. An assembly as set forth in claim 8 further characterized by said cross member (28) being disposed within said base member (12) and support brackets (20, 22) for allowing nesting engagement of said cross member (28) with said base member (12) and said front support bracket (20) when said assembly is in said forwardly folded position.

13. An assembly as set forth in claim 12 further characterized by said locking means (40) comprising at least one locking member (42) for engaging said pin (36) and preventing translational movement of said pin (36).

14. An assembly as set forth in claim 13 further characterized by said locking means (40) further including biasing means for biasing said locking member (42) into said pin (36) for locking said assembly (10) in th upright seating position.

15. An assembly as set forth in claim 14 further characterized by said locking means (40) further including release means (44) for releasing said locking member (42) from said pin (36) to allow translational movent of said pin (36) within said slot (38).

16. An assembly as set forth in claim 15 (44) further characterized by said release means comprising a lever (46) for applying a force to said locking member (42).

17. An assembly as set forth in claim 16 further characterized by said biasing means comprising a spring.

18. An assembly as set forth in claim 17 further characterized by said seat support means (18) further comprising counterbalance means (50) for aiding pivoting movement of said seat supporting means (18) between the upright seating position and the forwardly folded position.

19. An assembly as set forth in claim 18 further characterized by said counterbalance means (50) comprising a spring (50, said spring (50) mounted on said cross member (28).

20. An assembly as set forth in claim 19 further characterized by including latching means (60) for permitting selective pivoting movement of said upper back rest portion between the upright seating position (58) and forwardly folded position.

* * * * *